US006399716B2

(12) United States Patent
Chung et al.

(10) Patent No.: US 6,399,716 B2
(45) Date of Patent: Jun. 4, 2002

(54) COPOLYESTER RESIN COMPOSITION AND A PROCESS OF PREPARATION THEREOF

(75) Inventors: Hyun Soo Chung; Jae Wang Lee; Dong Hoon Kim; Do Youn Kim, all of Seoul; Suok Woo Lee, Kangwon-do, all of (KR)

(73) Assignee: IRE Chemical Ltd., Seoul (KR)

( * ) Notice: Subject to any disclaimer, the term of this patent is extended or adjusted under 35 U.S.C. 154(b) by 0 days.

(21) Appl. No.: 09/734,669

(22) Filed: Dec. 13, 2000

(30) Foreign Application Priority Data

Dec. 17, 1999 (KR) .............................. 99-58816

(51) Int. Cl.$^7$ .................... C08F 20/00; C08G 63/78
(52) U.S. Cl. ................ 525/444; 528/275; 528/276; 528/281; 528/283; 528/285; 528/286; 528/300; 528/301; 528/302; 528/307; 528/308; 528/308.6; 524/115; 524/127; 524/135; 524/136
(58) Field of Search ................ 528/275, 276, 528/281, 283, 285, 286, 300, 301, 302, 307, 308, 308.6; 525/444; 524/115, 127, 135, 136

(56) References Cited

U.S. PATENT DOCUMENTS

| 5,128,439 A | 7/1992 | Satori et al. |
| 5,661,193 A | 8/1997 | Khemani |

FOREIGN PATENT DOCUMENTS

| JP | 6080872 | 3/1994 |
| KR | 95-25072 | 9/1995 |
| KR | 120828 | 10/1997 |
| KR | 121998 | 11/1997 |
| WO | WO 96/25448 | 8/1996 |

OTHER PUBLICATIONS

European Search Report for EP 00 31 0993 Mar. 12, 2001.

Primary Examiner—Samuel A. Acquah
(74) Attorney, Agent, or Firm—Shanks & Herbert

(57) ABSTRACT

An aromatic group containing copolyester resin composition which has good biodegradability and physical properties, wherein; (i) 0.1 wt % to 30 wt % of an aliphatic prepolymers having number average molecular weight of from 300 to 30,000; (ii) one or a plurality of aromatic dicarboxylic acid (or an acid anhydride thereof which containing aromatic group in the molecule; (iii) one or a plurality of aliphatic (including cyclic type) dicarboxylic acid (or an acid anhydride thereof); and (iv) one or a plurality of aliphatic (including cyclic type) glycol, wherein the copolyester resin has number average molecular weight of from 30,000 to 90,000, weight average molecular weight of from 100,000 to 600,000, melting point of from 70° C. to 150° C., and melt index of from 0.1 to 50 g/10min. (190° C., 2,160 g), and the process for preparing and/or producing the same. The composition and preparation method provides a high molecular weight copolyester resin which has good biodegradability and physical properties required for packaging film, trash bags and agricultural film.

17 Claims, No Drawings

COPOLYESTER RESIN COMPOSITION AND A PROCESS OF PREPARATION THEREOF

FIELD OF THE INVENTION

The present invention relates to a copolyester resin composition which has good biodegradability and physical properties, and a process for preparing and/or producing the same. More particularly, the present invention have solved a problem of poor biodegradability of aromatic containing copolyester resin wherein the aromatic ingredients are incorporated to increase the physical properties of the copolyester.

DESCRIPTION OF THE BACKGROUND ART

The present invention relates to a copolyester resin composition and a process of preparation thereof which has good biodegradability and physical properties. The conventional aliphatic polyester completely biodegrade in the environment, but they have poor physical properties and inferior processability. To improve the physical properties and inferior processability, the aromatic group is incorporated to the aliphatic polyester, but the rate of biodegradation is greatly decreased because of the aromatic group.

The typical polyester resin used for various products including textures, fibers, moldings, formings, films, etc, is a high molecular weight aromatic polyester resin produced by the polycondensation reaction of terephthalic acid with ethylene glycol, or terephthalic acid with 1,4-butanediol. The high molecular weight polyester resin is a polymer having a number average molecular weight of over 10,000. Such aromatic polyester resins are not degradable naturally so it is a serious. worldwide of environmental concern.

Otherwise, the aliphatic polyester resins are known as being biodegradable (J. Macromol. Sci.-Chem., A23(3), pp.393–409 (1986)). They have a variety of usage in the medical and agricultural fields, and other applications are being developed.

However, the conventional aliphatic polyester resin has a low melting point and a high melt index, because of the structure of the main chain and the crystallinity thereof, and having low heat resistance and unsatisfactory mechanical properties, the usage of this polymer material has been limited. In order to utilize this aliphatic polyester resin, it should have a number average molecular weight of more than 30,000. However, it is difficult to manufacture the aliphatic polyester resins having a number average molecular weight of more than 15,000 using the conventional poly-condensation reaction system because further growth reaction is surpassed by decomposition reaction due to the poor heat stability of aliphatic polyesters.

In order to solve this problem, Korean Laid-Open Patent No. 95-758 discloses the process of preparing high molecular weighted aliphatic polyester resin having a number average molecular weight of more than 30,000, by controlling the reaction temperature, the degree of vacuum and the amount of catalyst. However, this aliphatic polyester resin has poor processability because of its low weight average molecular weight and low heat stability.

In another method, Korean Laid-Open Patent No. 95-114171 discloses the process of preparing the high molecular weighted aliphatic polyester resin by introducing monomer which containing poly(at least three)-functional groups, where the recommended functional group is hydroxy group(—OH) or carboxylic group(—COOH). According to this process, by introducing the monomer, the reaction time can be reduced and the processability of the resin can be enhanced by broadening molecular weight distribution. However, the utilization of the polyester resin thereof is very difficult because the physical property such as a tensile strength is poor due to the increased amount of low molecular weight portions. Furthermore, it is difficult to control the reaction for preparing the polyester resin, because the polyester resin easily becomes a gel type.

In yet another process for increasing the molecular weight of the aliphatic polyester resin, Korean Laid-Open Patent No. 95-25072 discloses the high molecular weighted aliphatic polyester resin produced by using isocyanate is a coupling agent reacting to an aliphaltic polyester resin having a number average molecular weight of from 15,000 to 20,000, which is produced by de-hydration reaction or de-glycol reaction of (1) an aliphatic (including, cyclic type), and (2) an aliphatic (including cyclic type) dicarboxylic acid (or an acid anhydride thereof), and a little of (3) monomer of polyhydric alcohol or polyhydric carboxylic acid (or acid anhydride thereof). According to the application, the aliphatic polyester resin has a number average molecular weight of from 20,000 to 70,000. However, this process requires more time for the reaction which leads to the poor production yield. And the isocyanate used as a coupling agent to increase the molecular weight is harmful to the human body so it needs to be handled carefully.

In yet another process, by incorporating aromatic group to the aliphatic polyester, the physical properties have been greatly improved, but the rate of biodegradation gets very slow.

SUMMARY OF THE INVENTION

The present invention provides a copolyester resin composition which has good biodegradability and a process for preparing and/or producing the same. To improve the biodegradability and physical properties of the copolyester, the present invention applied multistage reaction step, and copolyester resin having number average molecular weight of from 30,000 to 90,000, weight average molecular weight of from 100,000 to 600,000, melting point of from 70° C. to 150° C., and melt index of from 0.1 to 50 g/10 minute (190° C., 2,160 g) is obtained. The biodegradability and physical properties of the copolyester resin of present invention has been greatly enhanced by incorporating (i) an "aliphatic prepolymers" having number average molecular weight of from 300 to 30,000, thus the aromatic components distribute randomly and not contiguously more than 8 aromatic components in a row in the dicarboxylic acid positions of the copolyester chain. So it can be used in many practical uses including packaging film. trash bags and agricultural Film.

To solve the above mentioned problems. the present inventors applied multi-stage reaction step. The copolyester resin composition according to the present invention would be described in detail hereinafter.

In the first reaction step, the oligomer-like substances (hereinafter, referred to as "aliphatic prepolymers") having number average molecular weights of from 300 to 30,000 is obtained through one or a plurality of condensation, esterification and ester-exchange reaction with;

(a) one or a plurality of aliphatic (including cyclic type) dicarboxylic acid (or an acid anhydride thereof), selected from succinic acid, glutaric acid, adipic acid, pimelic acid, suberic acid, azelaic acid, sebacic acid, 1,9-nonanedicarboxylic acid, 1,10-decanedicarboxylic acid; and (b) one or a plurality of aliphatic (including cyclic type) glycols, selected from ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 1,2-octanediol, 1,8-octanediol, 1,9-nonanediol, 1,2-decanediol, 1,10-decanediol, decamethylene glycol.

Next, in the second reaction step, with the existence of (i) an "aliphatic prepolymers" which was produced in the first reaction step, from 0.1 wt % to 30 wt %, (ii) one or a plurality of aromatic dicarboxylic acid (or an acid anhydride thereof) which containing aromatic group in the molecule, selected from dimethyl terephthalate, terephthalic acid, phthalic acid, phthalic anhydride, isophthalic acid, 4-methylphthalic acid, 4-methylphthalic anhydride, dimethyl phthalate; and (iv) one or a plurality of aliphatic (including cyclic type) glycol selected from ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 1,2-octanediol, 1,8-octanediol, 1,9-nonanediol, 1,2-decanediol, 1,10-decanediol, decamethylene glycol, are added, one or a plurality of esterification and ester-exchange reaction are performed, and then produced water or methanol is extracted.

And. in the third reaction step, (iii) once or a plurality of aliphatic (including cyclic type) dicarboxylic acid (or an acid anhydride thereof), selected from succinic acid, glutaric acid, adipic acid, pimelic acid, suberic acid, azelaic acid, sebacic acid, 1,9-nonanedicarboxylic acid, 1,10-decanedicarboxylic acid, is added thereto, and one or a plurality of esterification and ester-exchange reaction are performed. After the produced water or methanol is extracted, polymeric resin is obtained.

Finally, in the fourth reaction step, by polycondensing the polymeric resin which was obtained in the third reaction step, a copolyester resin with number average molecular weight of from 30,000 to 90,000, weight average molecular weight of from 100,000 to 600,000, melting point of from 70° C. to 150° C., and melt index of from 0.1 to 50 g/10 min. (190° C., 2,160 g) is obtained. This copolyester resin has good processability, physical properties and biodegradability.

By performing the multi-stage reaction step, the aromatic components distribute randomly and not contiguously more than 8 aromatic components in a row in the dicarboxylic acid positions of the copolyester chain.

To describe in more detail about the copolyester resin composition of this invention, in the first reaction step, (i) an "aliphatic prepolymers" having number average molecular weight of from 300 to 30,000, is produced by performing reactions which are selected from at least one of the following reactions; condensation reaction, or an esterification reaction, or an ester-exchange reaction, with (a) one or a plurality of aliphatic (including cyclic type) dicarboxylic acid (or an acid anhydride thereof) ingredient including succinic acid; and (b) one or a plurality of aliphatic (including cyclic type) glycol selected from at least one of 1,4-butanediol and ethylene glycol, preferably ① succinic acid alone; ethylene glycol alone or mixture of ethylene glycol and other glycol (C3–C10 alkylene, C4–C10 cycloalkylene), ② succinic acid alone; 1,4-butanediol alone or mixture of 1,4-butanediol and other glycol (C2–C3 and C5–C10 alkylene, C4–C10 cycloalkylene), ③ succinic acid alone or mixture of succinic acid and other dicarboxylic acid (C3–C10 alkylene, C4–C10 cycloalkylene); ethylene glycol alone, ④ succinic acid alone or mixture of succinic acid and other dicarboxylic acid (C3–C10 alkylene, C4–C10 cycloalkylene); 1.4-butanediol alone, ),⑤ succinic acid alone or mixture of succinic acid and other dicarboxylic acid (C3–C10 alkylene, C4–C10 cycloalkylene); ethylene glycol alone or mixture of ethylene glycol and other glycol (C3–C10 alkylene, C4–C10 cycloalkylene), ⑥ succinic acid alone or mixture of succinic acid and other dicarboxylic acid (C3–C10 alkylene, C4–C10 cycloalkylene); 1,4-butanediol alone or mixture of 1,4-butanediol and other glycol (C2–C3 and C5–C10 alkylene, C4–C10 cycloalkylene)

In the second reaction step, with the existence of from 0.1 wt % to 30 wt % of (i) an "aliphatic prepolymers" which was produced in the first reaction step, (ii) one or a plurality of aromatic dicarboxylic acid (or an acid anhydride thereof) which containing aromatic group in the molecule, including dimethyl terephthalate and terephthalic acid; and (iv) one or a plurality of aliphatic (including cyclic type) glycol selected from at least one of 1,4-butanediol and ethylene glycol, preferably ① dimethyl terephthalate (including terephthalic acid) alone; ethylene glycol alone or mixture of ethylene glycol and other glycol (C3–C10 alkylene, C4–C10 cycloalkylene), ② dimethyl terephthalate (including terephthalic acid) alone; 1,4-butanediol alone or mixture of 1,4-butanediol and other glycol (C2–C3 and C5–C10 alkylene, C4–C10 cycloalkylene), ③ dimethyl terephthalate (including terephthalic acid) alone or mixture of dimethyl terephthalate (including terephthalic acid) and other aromatic dicarboxylic acid (or an acid anhydride thereof); ethylene glycol alone, ④ dimethyl terephthalate (including terephthalic acid) alone or mixture of dimethyl terephthalate (including terephthalic acid) and other aromatic dicarboxylic acid (or an acid anhydride thereof); 1,4-butanediol alone, ⑤ dimethyl terephthalate (including terephthalic acid) alone or mixture of dimethyl terephthalate (including terephthalic acid) and other aromatic dicarboxylic acid (or an acid anhydride thereof); ethylene glycol alone or mixture of ethylene glycol and other glycol (C3–C10 alkylene, C4–C 10 cycloalkylene), ⑥ dimethyl terephthalate (including terephthalic acid) alone or mixture of dimethyl terephthalate (including terephthalic acid) and other aromatic dicarboxylic acid (or an acid anhydride thereof); 1,4-butanediol alone or mixture of 1,4-butanediol and other glycol (C2–C3 and C5–C10 alkylene, C4–C10 cycloalkylene), are added, and one or a plurality of esterification and ester-exchange reaction are performed and produced water or methanol is extracted.

The present invention provides a process for preparing and/,or producing above mentioned copolyester resin comprising four reaction steps which are described below in detail.

In the First reaction step, (i) an "aliphatic prepolymers" having number average molecular weights of from 300 to 30,000, is obtained through one or a plurality of condensation, esterification and ester-exchange reaction, at the temperature of from 160° to 240° C., with; (a) one or a plurality of aliphatic (including cyclic type) dicarboxylic acid (or an acid anhydride thereof) ingredient including succinic acid; and (b) one or a plurality of aliphatic (including cyclic type) glycol selected from at least one of 1,4-butanediol and ethylene glycol, and the produced water or the methanol is extracted. If the reaction temperature is lower than 160° C., the produced water or methanol are not extracted. If the reaction temperature is higher than 240° C., the reactant can be decomposed due to thermal degradation. During the reaction process, the chemical reaction is represented by the following formula (1). wherein succinic acid is employed for the (a) aliphatic (including cyclic type)

dicarboxylic acid (or an acid anhydride thereof) ingredient, and 1,4-butanediol is employed for the (b) aliphatic (including cyclic type) glycol.

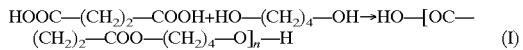

$$\text{HOOC—(CH}_2)_2\text{—COOH+HO—(CH}_2)_4\text{—OH} \rightarrow \text{HO—[OC—(CH}_2)_2\text{—COO—(CH}_2)_4\text{—O]}_n\text{—H} \quad (I)$$

In which n is an integer such that the number average molecular weight of the (i) "aliphatic prepolymers" is in the range of from 300 to 30,000.

To produce (i) an "aliphatic prepolymers" having number average molecular weight of from 300 to 30,000, the mole ratio of (a) aliphatic (including cyclic type) dicarboxylic acid (or an acid anhydride thereof) ingredient to (b) aliphatic (including, cyclic type) glycol ingredient is in the range of from 1.0: 1.15 to 1.0:2.0, and preferably in the range of from 1.0: 1.3 to 1.0: 1.4. If the mole ratio is less than 1.0: 1.15, the reactivity decreases and the resin becomes yellow or brown color. If the mole ratio exceeds 1.0:2.0, the production cost becomes very high.

Next, in the second reaction step, with the existence of (i) an "aliphatic prepolymers" which was produced in the first reaction step, from 0.1 wt % to 30 wt %, (ii) one or a plurality of aromatic dicarboxylic acid (or an acid anhydride thereof) which containing aromatic group in the molecule, including dimethyl terephthalate and terephthalic acid; and (iv) one or a plurality of aliphatic (including cyclic type) glycol selected from at least one of 14-butanediol and ethylene glycol, are added, and at the temperature of from 180 to 220° C. where the aromatic dicarboxylic acid become activated to react with the aliphatic glycol, one or a plurality of esterification and ester-exchange reaction are performed and produced water or methanol is extracted.

In the third reaction step, at the temperature of from 150° C. to 180° C. where the aromatic dicarboxylic acid become deactivated to react with the aliphatic glycol, (iii) one or a plurality of aliphatic (including cyclic type) dicarboxylic acid (or an acid anhydride thereof) ingredient including succinic acid, is added, and one or a plurality of esterification and ester-exchange reaction are performed. After the produced water or methanol is extracted, polymeric resin is obtained. If the reaction temperature is lower than 150° C., the produced water or methanol is not extracted. If the reaction temperature is higher than 180° C., the aromatic dicarboxylic acid become activated to react with the aliphatic glycol, so the rate of biodegradation decreases. By controlling the reaction temperature in the range of from 150° C. to 180° C., the aromatic dicarboxylic acid cannot join the reaction process any more.

For 1.0 mole of total dicarboxylic acid (or an acid anhydride thereof) ingredient (sum of (ii) and (iii)) which are added in the second and third reaction step, the mole ratio of (iv) aliphatic (including cyclic type) glycol is in the range of from 1.15 mole to 2.0 mole, and preferably in the range of from 1.3 mole to 1.4 mole. And for 1.0 mole of total dicarboxylic acid (or an acid anhydride thereof) ingredient which is added in the second and third reaction step, the mole ratio between aromatic component to aliphatic component is in the range of from 0.3:0.7 to 0.65:0.35. If the mole ratio is less than 0.3:0.7, the copolyester resin has low melting point and poor processability. If the mole ratio is higher than 0.65:0.35, the rate of biodegradation decreases because of the aromatic component.

Finally, in the fourth reaction step, by polycondensing the polymeric resin which was obtained in the third reaction step, at the temperature of from 220° C. to 260° C. and 0.005~10 Torr, a copolyester resin with number average molecular weight of from 30,000 to 90,000, weight average molecular weight of from 100,000 to 600,000, melting point of from 70° C. to 150° and melt index of from 0.1 to 50 g/10 min. (190° C., 2.1 60 g) is obtained.

At the start of and/or at the end of the esterification or ester-exchange reaction in the first, second and third reaction step, and at the start of polycondensation reaction in the fourth reaction step, catalyst alone or a mixture of a plurality of catalysts can be added, wherein the amount of the catalyst(s) is preferably in the range of from 0.02 wt % to 2.0 wt % of total reactants. If the amount of catalyst employed is less than 0.02 wt %, it is very slow to extract the theoretical amount of water, methanol or glycol, or it is impossible to extract. If the amount of the catalyst employed is more than 20 wt %, the color of the product is poor even though the theoretical amount of water, methanol or glycol is easily extracted. The catalysts are selected from one or a plurality of the metallic compounds consisting Ti, Ge, Zn, Fe, Mn, Co, and Zr, preferably, an organic metallic compound consisting titanate, antimonate or tin oxide, more preferably, selected from one or a plurality of tetrabutyl titanate, calcium acetate, antimony trioxide, dibutyltin oxide, zinc acetate, antimony acetate, antimony glycolate, tetrapropyl titanate.

Additionally, at the start of and/or the end of the esterification or ester-exchange reaction in the first, second and third reaction step, and at the start of and/or the end of the polycondensation reaction in the fourth reaction step, a stabilizer can be added wherein the amount of the stabilizer employed preferably ranges from 0.02 wt % to 20 wt %. If the amount of the stabilizer used is less than 0.02 wt %, the effect of the stabilizer is not sufficient and the color of the product is yellow or brown. If the amount of the stabilizer exceeds 2.0 wt %, the time required for the reaction is extended and the product would not have high molecular weight. Therefore, the preferable amount of the stabilizer is about 0.22 wt %, and the stabilizer used is at least one or a plurality selected from phosphatic stabilizers consisting trimethyl phosphate, phosphoric acid and triphenyl phosphate.

The copolyester resin according to the present invention has good physical properties and biodegradability, so the limitations put by the conventional aliphatic polyester because of the poor tensile strength and tear strength, can be solved. The conventional aliphatic polyester completely biodegrade in the environment, but they have poor physical properties and inferior processability to apply for the packaging film, trash bags and agricultural film. And the copolyester which containing aromatic group has good physical properties, but the rate of biodegradation decreased, greatly. But the copolyester resin of the present invention has solved the above mentioned problems, and can be used in packaging film, trash bags and agricultural film.

Having this invention described in general, a further understanding can be obtained with reference to certain specific examples which are provided hereinafter for the purpose of illustration only and are not intended to be limited unless otherwise specified.

EXAMPLES

In the following examples, the tensile strength, elongation at break of the films were measured by ASTM D882 after the copolyester was press-formed about 150 μm thickness; the melt index (MI) was measured by ASTM D1238, where the temperature was 190° C. and the load was 2,160 g. The melting point was measured by using differential scanning calorimetry (DSC) with the scan rate of 10° C./minute. Molecular weights are measured by gel permeation chromatography (GPC) and are based on polystyrene equivalent molecular weights.

The biodegradation test was done with the 35 μm thickness blown film, and the sample was cut into the dimension of 20 cm by 20 cm. To prevent the loss of the film sample, the sample was put between one pair of sieve (No. 18 mesh whose opening is 1 mm), and buried in 10 cm depth in soil. And the sample was checked every one month, and the weight loss due to the biodegradation was checked. The test was done at the R&D Center of Ire Chemical Ltd.(5-29, Bangye-Ri, Munmak-Up, Wonju-Si, Kangwon-Do, Korea). The biodegradation test was personnel during summer season, from June to August, and the 3 film samples were prepared, and averaged the weight loss data.

EXAMPLE 1

First, after purging a 500 ml reactor with nitrogen, 23.6 g of succinic acid, 27g of 1,4-butanediol, and 0.1 g, of tetrabutyl titanate acting as a catalyst are added to a reactor, and the mixture is esterification reacted until the approximate theoretical amount of water is produced at the temperature of 205° C. After water is extracted, 34.4 g of "aliphatic prepolymers", wherein the number average molecular weight of "aliphatic prepolymers" is approximately 600, is obtained.

And then, 77.7 g of dimethyl terephthalate, 135.2 g of 14-butaniediol, 0.2 g of tetrabutyl titanate acting as a catalyst are added thereto, and the mixture is ester-exchange reacted until the approximate theoretical amount of methanol is produced at the temperature of 205° C. After the methanol is extracted, 35.4 g of succinic acid and 43.8 g of adipic acid are added thereto, and the mixture is esterification reacted until the approximate theoretical amount of water is produced at the temperature of 180° C.

And then, 0.1 g of antimony trioxide, 0.3 of dibutyltin oxide, 0.07 of tetrabutyl titanate acting as catalysts, and 0.1 of trimethyl phosphate acting as a stabilizer are added thereto.

Finally, the temperature is elevated to 245° C. and polycondensation (or condensation-polymerization) is allowed to proceed for 180 minutes under 0.3 Torr vacuum condition.

The product has a melt index of 6 g/10 min. (190 ° C., 2,160 g), a number average molecular weight of 48,000, a weight average molecular weight of 310,000 and a melting point of 80° C.

The weight loss on biodegradation was 21 wt % after 1 month, 53 wt % after 2 months and 91 wt % after 3 months.

EXAMPLE 2

First, after purging a 500 ml reactor with nitrogen 2.95 g of succinic acid. 3.65 g of adipic acid, 6.3 of 1,4-butanediol, and 0.1 g of tetrabutyl titanate acting as a catalyst are added to a reactor, and the mixture is esterification reacted until the approximate theoretical amount of water is produced at the temperature of 205° C. After water is extracted, 9.3 of "aliplhatic prepolymers", wherein the number average molecular weight of "aliphatic prepolymers" is approximately 1,500, is obtained.

And then, 78.8 of dimethyl terephthalate, 126 of 1,4-butanediol, 6.2 of ethylene glycol, and 0.2 of tetrabutyl titanate acting as a catalyst are added thereto, and the mixture is ester-exchange reacted until the approximate theoretical amount of methanol is produced at the temperature of 205° C. After the methanol is extracted, 70.8 of succinic acid is added thereto, and the mixture is esterification reacted until the approximate theoretical amount of water is produced at the temperature of 180° C.

And then, 0.1 g of antimony trioxide, 0.3 g of dibutyltin oxide, 0.07 g of tetrabutyl titanate acting as catalysts, and 0.1 g of trimethyl phosphate acting as a stabilizer are added thereto.

Finally, the temperature is elevated to 245° C. and polycondensation (or condensation-polymerization) is allowed to proceed for 220 minutes under 0.3 Torr vacuum condition.

The product has a melt index of 7 g/10 min. (190° C., 2,160 g), a number average molecular weight of 47,000, a weight average molecular weight of 230,000 and a melting point of 90° C.

The weight loss on biodegradation was 1.5 wt % after 1 month, 32 wt % after 2 months and 68 wt % after 3 months.

EXAMPLE 3

First, after purging a 500 ml reactor with nitrogen, 2.95 g of succinic acid, 2.48 g of ethylene glycol, and 0.1 g of tetrabutyl titanate acting as a catalyst are added to a reactor, and the mixture is esterification reacted until the approximate theoretical amount of water is produced at the temperature of 205° C. After water is extracted, 3.6 g of "aliphatic prepolymers", wherein the number average molecular weight of "aliphatic prepolymers" is approximately 400. is obtained.

And then, 108.4 g of dimethyl terephthalate, 135.2 g of 1,4-butanediol, and 0.2 g of tetrabutyl titanate acting as a catalyst are added thereto, and the mixture is ester-exchange reacted until the approximate theoretical amount of methanol is produced at the temperature of 205 ° C. After the methanol is extracted, 53.1 g of succinic acid is added thereto, and the mixture is esterification reacted until the approximate theoretical amount of water is produced at the temperature of 180° C.

And then, 0.1 g of antimony trioxide, 0.3 g of dibutyltin oxide, 0.07 g of tetrabutyl titanate acting as catalysts, and 0.1 g of trimethyl phosphate acting as a stabilizer are added thereto.

Finally, the temperature is elevated to 245° C. and polycondensation (or condensation-polymerization) is allowed to proceed for 200 minutes under 0.3 Torr vacuum condition.

The product has a melt index of 8 g/10 min. (190° C., 2,160 g), a number average molecular weight of 41,000, a weight average molecular weight of 170,000 and a melting point of 128° C.

The weight loss on biodegradation was 6 wt % after 1 month, 18 wt % after 2 months and 37 wt % after 3 months.

EXAMPLE 4

First, after purging a 500 ml reactor with nitrogen, 5.9 g of succinic acid, 6.3 g of 1,4-butanediol, and 0.1 g of tetrabutyl titanate acting as a catalyst are added to a reactor, and the mixture is esterification reacted until the approximate theoretical amount of water is produced at the temperature of 205° C. After water is extracted, 8.6 g of "aliphatic prepolymers", wherein the number average molecular weight of "aliphatic prepolymers" is approximately 3,000, is obtained.

And then, 76.1 g of terephthalic acid, 135.2 g, of 1,4-butanediol, and 0.2 g of tetrabutyl titanate acting as a catalyst are added thereto and the mixture is esterification reacted until the approximate theoretical amount of water is produced at the temperature of 205° C. After the water is extracted, 29.5 g of succinic acid and 43.8 g of adipic acid are added thereto and the mixture is esterification reacted until the approximate theoretical amount of water is produced at the temperature of 180° C.

And then, 0.1 g of antimony trioxide, 0.3 g of dibutyltin oxide, 0.07 g of tetrabutyl titanate acting as catalysts and 0.1 g of trimethyl phosphate acting as a stabilizer are added thereto.

Finally, the temperature is elevated to 245° C. and polycondensation (or condensation-polymerization) is allowed to proceed for 180 minutes under 0.3 Torr vacuum condition.

The product has a melt index of 2 g/10 min. (190° C., 2,160 g), a number average molecular weight of 61,000, a weight average molecular weight of 290,000 and a melting point of 117° C.

The weight loss on biodegradation was 9 wt % after 1 month, 28 wt % after 2 months and 56 wt % after 3 months.

EXAMPLE 5

First, after purging a 500 ml reactor with nitrogen, 3.65 g of adipic acid, 4.05 g of 1,4-butaniediol, and 0.1 g of tetrabutyl titanate acting as a catalyst are added to a reactor, and the mixture is esterification reacted until the approximate theoretical amount of water is produced at the temperature of 205° C. After water is extracted, 5 g of "aliphatic prepolymers", the number average molecular weight of "aliphatic prepolymers" is approximately 10,000, is obtained.

And then, 66.8 g of terephthalic acid, 135.2 g of 1,4-butaiiediol, and 0.2 g of tetrabutyl titanate acting as a catalyst are added thereto and the mixture is esterification reacted until the approximate theoretical amount of water is produced at the temperature of 205° C. After the water is extracted, 87.6 g of adipic acid is added thereto, and the mixture is esterification reacted until the approximate theoretical amount of water is produced at the temperature of 180° C.

And then, 0.1 g of antimony trioxide, 0.3 g of dibutyltin oxide, 0.07 g of tetrabutyl titanate acting as catalysts and 0.1 g of trimethyl phosphate acting as a stabilizer are added thereto.

Finally, the temperature is elevated to 245° C. and polycondensation (or condensation-polymerization) is allowed to proceed for 200 minutes under 0.3 Torr vacuum condition.

The product has a melt index of 11 g/10 min. (190° C., 2,160 g), a number average molecular weight of 38,000, a weight average molecular weight of 174,000 and a melting point of 89° C.

The weight loss on biodegradation was 10 wt % after 1 month, 37 wt % after 2 months and 71 wt % after 3 months.

Comparative Example 1

After purging a 500 ml reactor with nitrogen, 66.8 g of terephthalic acid, 135.2 g of 1,4-butanediol, 70.8 g of succinic acid, and 0.07, of tetrabutyl titanate acting as a catalyst are added to a reactor. And the temperature is elevated under an atmosphere of nitrogen, esterification is allowed for 2 hours at the temperature of 200° C., and after nitrogen is stopped, esterification is continually allowed for 0.5 hours under 20 to 2 mmHg pressure.

And then, under an atmosphere of nitrogen, 0.07 g of tetrabutyl titanate, 0.45 g of dibutyltin oxide acting as catalysts, and 0.2 g of triniethyl phosphate acting, as a stabilizer are added thereto. Then, the de-glycol reaction is allowed for 200 minutes under 0.4 Torr pressure at the temperature of 250° C.

The product has a number average molecular weight of 18,000, a weight average molecular weight of 52,000 and a melting point of 92° C.

The weight loss on biodegradation was 2.5 wt % after 1 month, 9 wt % after 2 months and 21 wt % after 3 months.

Comparative Example 2

After purging a 500ml reactor with nitrogen, 83.5 g of terephthalic acid, 135.2 g of 1,4-butanediol, 59 g of succinic acid, and 0.07 g of tetrabutyl titanate acting as a catalyst are added to a reactor. And the temperature is elevated under an atmosphere of nitrogen, esterification is allowed for 2 hours at the temperature of 200° C., and after nitrogen is stopped, esterification is continually allowed for 0.5 hours under 20 to 2 mmHg pressure.

And then, under an atmosphere of nitrogen, 0.07 g of tetrabutyl titanate, 0.45 g of dibutyltin oxide acting as catalysts, and 0.2 g of trimethyl phosphate acting as a stabilizer are added thereto. Then, the de-glycol reaction is allowed for 200 minutes under 0.4 Torr pressure at the temperature of 250° C.

The product has a number average molecular weight of 22,000, a weight average molecular weight of 61,000 and a melting point of 121° C.

The weight loss on biodegradation was 1 wt % after 1 month, 5 wt % after 2 months and 7 wt % after 3 months.

Comparative Example 3

After purging a 500 ml reactor with nitrogen, 66.8 g of terephthalic acid, 135.2 g of 1,4-butanediol, 29.5 g of succinic acid, 36.5 g of adipic acid. and 0.7 g of tetrabutyl titanate acting as a catalyst are added to a reactor. And the temperature is elevated under an atmosphere of nitrogen, esterification is allowed for 2 hours at the temperature of 200° C., and after nitrogen is stopped, esterification is continually allowed for 0.5 hours under 20 to 2 mmHg pressure.

And then, under an atmosphere of nitrogen, 0.07 g of tetrabutyl titanate, 0.45 g of dibutyltin oxide acting as catalysts, and 0.2 g of trimethyl phosphate acting as a stabilizer are added thereto. Then, the de-glycol reaction is allowed for 200 minutes under 0.4 Torr pressure at the temperature of 250° C.

The product has a number average molecular weight of 15,000, and a weight average molecular weight of 43,000 and a melting point of 90° C.

The weight loss on biodegradation was 3 wt % after 1 month, 11 wt % after 2 months and 24 wt % after 3 months.

The properties of the copolyester resin of the present invention according to the examples 1 to 5 and the conventional copolyester resin according to the comparative examples 1 to 3 are provided in Table 1.

As shown in table 1, the copolyester resin of the present invention is high molecular weighted polymer both in number average and in weight average, and has good physical properties and biodegradation, so it can be used in many practical uses including packaging film, trash bags and agricultural film.

TABLE 1

|  | EXAMPLE | | | | | COMPARATIVE EXAMPLE | | |
|---|---|---|---|---|---|---|---|---|
|  | 1 | 2 | 3 | 4 | 5 | 1 | 2 | 3 |
| Succinic acid | 35.4 | 70.8 | 53.1 | 29.5 |  | 70.8 | 59.0 | 29.5 |
| Adipic acid | 43.8 |  |  | 43.8 | 87.6 |  |  | 36.5 |
| Ethylene glycol |  | 6.2 |  |  |  |  |  |  |
| 1,4-butanediol | 135.2 | 126.0 | 135.2 | 135.2 | 135.2 | 135.2 | 135.2 | 135.2 |
| Terephthalic acid |  |  |  | 76.1 | 66.8 | 66.8 | 83.5 | 66.8 |
| Dimethyl terephthalate | 77.7 | 78.8 | 108.4 |  |  |  |  |  |
| "aliphatic prepolymers" having Mn of 300 to 30,000 | 34.4 | 9.3 | 3.6 | 8.6 | 5.0 |  |  |  |
| Number average Molecular weight | 48,000 | 47,000 | 41,000 | 61,000 | 38,000 | 18,000 | 22,000 | 15,000 |
| Weight average Molecular weight | 310,000 | 230,000 | 170,000 | 290,000 | 174,000 | 52,000 | 61,000 | 43,000 |
| Tensile strength (kg/cm$^2$) | 400 | 380 | 370 | 450 | 320 | 150 | 200 | 140 |
| Elongation (%) | 700 | 700 | 700 | 700 | 700 | 400 | 600 | 200 |
| MI (g/10 min) | 6 | 7 | 8 | 2 | 11 | NA | 70 | NA |
| Melting point (° C.) | 80 | 90 | 128 | 117 | 89 | 92 | 121 | 90 |
| Weight loss on Biodegradation (%) |  |  |  |  |  |  |  |  |
| after 1 month | 21 | 15 | 6 | 9 | 10 | 2.5 | 1 | 3 |
| after 2 month | 53 | 32 | 18 | 28 | 37 | 9 | 5 | 11 |
| after 3 month | 91 | 68 | 37 | 56 | 71 | 21 | 7 | 24 |

THE ADVANTAGES OF THE PRESENT INVENTION

The present invention suggests a copolyester resin composition which has good physical properties and biodegradation, wherein: (i) an "aliphatic prepolymers" having number average molecular weight of from 300 to 30,000; (ii) one or a plurality of aromatic dicarboxylic acid (or an acid anhydride thereof) which containing aromatic group in the molecule, including dimethyl terephthalate and terephthalic acid, (iii) one or a plurality of aliphatic (including cyclic type) dicarboxylic acid (or an acid anhydride thereof) ingredient including succinic acid; and (iv) one or a plurality of aliphatic (including cyclic type) glycol selected from at least one of 1,4-butanediol and ethylene glycol, wherein the copolyester resin has number average molecular weight of from 30,000 to 90,000, weight average molecular weight of from 100,000 to 600,000. melting point of from 70° C. to 150° C., and melt index of from 0.1 to 50 g/10 min. (190° C., 2,1 60 g). and the process for preparing and/or producing the same. The copolyester resin in the present invention is obtained by performing the multi-stage reaction step, and thus the aromatic component portion are distribute randomly and not contiguously more than 8 aromatic component in a row in the dicarboxylic acid position of the copolyester chain. So the microorganism in the environment can attack the copolyester main chain, and can biodegrade it into carbon dioxide and water. It can be used in many practical uses including packaging film, trash bags and agricultural film. The environmental problem of plastic which causes worldwide concern can be solved by commercializing biodegradable copolyester which can be transform into carbon dioxide and water in the environment.

What is claimed:

1. A copolyester resin composition having number average molecular weight of from 30,000 to 90,000, comprising (i) 0.1 to 30% by weight of an aliphatic prepolymers represented by the following chemical formula 1:

HO—[OC—(CH$_2$)$_a$—COO—(CH$_2$)$_b$—O]$_n$—H (1)

where a is 2~10, b is 2~10 and n is an integer such that the number average molecular weight of the aliphatic prepolymers is 300 to 30,000; (ii) one or a plurality of aromatic dicarboxylic acid (or an acid anhydride thereof); (iii) one or a plurality of aliphatic (including cyclic type) dicarboxylic acid (or an acid anhydride thereof); and (iv) one or a plurality of aliphatic (including cyclic type) glycol.

2. The copolyester resin composition according to claim 1, wherein said copolyester resin composition has weight average molecular weight of from 100,000 to 600,000, determined by GPC; melting point of from 70° C. to 150° C., determined by DSC; and melt index of from 0.1 to 50 g/10 min. (190° C., 2,160 g) determined by ASTM D1238.

3. The copolyester resin composition according to claim 1, wherein said aliphatic prepolymer having number average molecular weight of from 300 to 30,000 is prepared by performing reaction which is selected from at least one of the following reactions; condensation reaction, or an esterification reaction, or an ester-exchange reaction with
   (a) one or a plurality of aliphatic dicarboxylic acid (or an acid anhydride thereof) and
   (b) one or a plurality of aliphatic glycol.

4. The copolyester resin composition according to claim 3, wherein the mole ratio of the aliphatic dicarboxylic acid (or an acid anhydride thereof) to the aliphatic glycol is from 1:1.1 to 1:2.

5. The copolyester resin composition according to claim 1, wherein the mole ratio of the total dicarboxylic acid to the aliphatic glycol is from 1:1.1 to 1:2.

6. The copolyester resin composition according to claim 1, wherein said aromatic dicarboxylic acid(or an acid anhydride thereof) is selected from the group consisting of dimethyl terephthalate, terephthalic acid, phthalic acid, phthalic anhydride, isophthalic acid, 4-methylphthalic acid, 4-methylphthalic anhydride and dimethyl phthalate and the mixtures thereof.

7. The copolyester resin composition according to claim 1, wherein said aliphatic dicarboxylic acid (or an acid anhydride thereof) is selected from the group consisting of succinic acid, glutaric acid, adipic acid, pimelic acid, suberic acid, azelaic acid, sebacic acid, 1,9-nonanedicarboxylic acid, 1,10-decanedicarboxylic acid and/or an acid anhydride thereof and the mixture thereof.

8. The copolyester resin composition according to claim 1, wherein said aliphatic glycol is selected from the group consisting of ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 1,2-octanediol, 1,8-octanediol, 1,9-nonanediol, 1,2-decanediol, 1,10-decanediol, decamethylene glycol and the mixture thereof.

9. The copolyester resin composition according to claim 3, wherein said aliphatic dicarboxylic acid (or an acid anhydride thereof) is selected from the group consisting of succinic acid, glutaric acid, adipic acid, pimelic acid, suberic acid, azelaic acid, sebacic acid, 1,9-nonanedicarboxylic acid, 1,10-decanedicarboxylic acid and/or an acid anhydride thereof and the mixture thereof.

10. The copolyester resin composition according to the claim 3, wherein said aliphatic glycol is selected from the group consisting of ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 12-octanediol, 1,8-octanediol, 1,9-nonanediol, 1,2-decanediol, 1,10-decanediol, decamethylene glycol and the mixture thereof.

11. A method for preparing a high molecular weight copolyester resin comprising;

a first step of preparing an aliphatic prepolymers having number average molecular weight of from 300 to 30,000 comprising reaction which are selected from at least one or plurality of condensation, esterification, and ester-exchange reaction with one or a plurality of aliphatic (including, cyclic type) dicarboxylic acid (or an acid anhydride thereof) and one or a plurality of aliphatic (including cyclic type) glycol;

a second step of performing reaction which are selected from one of esterification and ester-exchange reaction with the aliphatic prepolymers of the first step, one or a plurality of aromatic dicarboxylic acid (or an acid anhydride thereof) and one or a plurality of aliphatic (including cyclic type) )glycol at the temperature of from 180° C. to 220° C.;

a third step of preparing polymeric resin comprising reaction which are selected from one of esterification and ester-exchange reaction adding one or a plurality of aliphatic (including cyclic type) dicarboxylic acid (or an acid anhydride thereof) to the product of the second step at the temperature of from 150° C. to 180° C.; and a fourth step of performing a polycondensation of the product of the third step at the temperature of from 220° C. to 260° C. under 0.005~10 Torr.

12. The method for preparing copolyester resin according to claim 11, wherein the mole ratio of the aliphatic dicarboxylic acid to the aliphatic glycol is from 1:1.1 to 1:2.

13. The method for preparing copolyester resin according to claim 11, wherein the mole ratio of the dicarboxylic acid to the aliphatic glycol is from 1:1.1 to 1:2.

14. The method for preparing copolyester resin according to the claim 11, wherein from 0.02 wt %, to 2 wt % of catalyst is presented at the start or at the end of the esterification or ester-exchange reaction in the first, second and third reaction step.

15. The method for preparing, copolyester resin according to the claim 14, wherein said catalyst is selected from the group consisting of tetrabutyl titanate, calcium acetate, antimony trioxide, dibutyltin oxide, zinc acetate, antimony acetate, antimony glycolate, tetrapropyl titanate and the mixtures thereof.

16. The method for preparing copolyester resin according to claim 11, wherein from 0.02 wt % to 2 wt % of stabilizer is presented at the start or at the end of the esterification or ester-exchange reaction in the first, second and third reaction step.

17. The method for preparing copolyester resin according to claim 16, wherein the stabilizer is selected from the group consisting of trimethyl phosphate, phosphoric acid, triphenyl phosphate and the mixtures thereof.

* * * * *